United States Patent [19]

Kenjyo

[11] Patent Number: 4,800,139
[45] Date of Patent: Jan. 24, 1989

[54] METHOD OF PRODUCING HYDROGEN ELECTRODE AND USE THEREOF IN FUEL CELLS

[75] Inventor: Tadao Kenjyo, Noboribetsu, Japan

[73] Assignee: Muroran Institute of Technology, Muroran, Japan

[21] Appl. No.: 105,953

[22] Filed: Sep. 28, 1987

Related U.S. Application Data

[62] Division of Ser. No. 800,415, Nov. 21, 1985, abandoned.

[51] Int. Cl.[4] .................... H01M 4/86; H01M 4/88
[52] U.S. Cl. ........................................ 429/42; 429/44; 502/101; 502/301
[58] Field of Search ................ 429/42, 44; 502/101, 502/301

[56] References Cited

U.S. PATENT DOCUMENTS

| | | | |
|---|---|---|---|
| 3,409,474 | 11/1968 | Jang et al. | 429/42 |
| 3,637,437 | 1/1972 | Goldberger | 429/44 |
| 3,862,911 | 7/1975 | Chabert | 502/301 |
| 3,877,994 | 4/1975 | Chottiner | 429/44 X |
| 3,997,478 | 12/1976 | Petro | 502/301 |
| 4,115,628 | 9/1978 | Bonnemay et al. | 429/44 |
| 4,126,934 | 11/1978 | Richter et al. | 429/44 X |
| 4,301,218 | 11/1981 | Bovczur-Urmossy | 429/44 X |
| 4,383,010 | 5/1983 | Spaepen | 429/42 |
| 4,457,953 | 7/1984 | McIntyre et al. | 502/101 X |

Primary Examiner—Brain E. Hearn
Assistant Examiner—Stephen J. Kalafut

[57] ABSTRACT

An excellent stable hydrogen electrode of low polarization is provided which comprises Raney nickel catalyst containing about 0.2-2% by weight of chromium. Such hydrogen electrode is produced safely without spontaneous ignition of the catalyst by mixing and kneading a powder of the catalyst and a suspension liquid of polytetrafluoroethylene (PTFE) while dehydrating at low temperature.

12 Claims, 6 Drawing Sheets

METHOD OF PRODUCING HYDROGEN ELECTRODE AND USE THEREOF IN FUEL CELLS

This is a Division of application Ser. No. 06/800,415, filed Nov. 21st, 1985, now abandoned.

BACKGROUND OF THE INVENTION

1. Field of the Invention

The present invention relates to a hydrogen electrode of an alkaline type hydrogen-oxygen fuel cell, and a method of producing the same.

2. Description of the Related Art

Heretofore, it is well known that Raney nickel is more effective than Raney chrome as a catalyst in a hydrogen electrode of a fuel cell, as described in Japanese patent application publication Nos. 22,996/75 and 22,997/75. However, Raney nickel, when used as a catalyst in a hydrogen electrode, has drawbacks in that it can not afford a high electric current generation efficiency because of its large polarization and because the output voltage of a fuel cell using the hydrogen electrode is decreased with the elapse of time. In order to obviate these drawbacks, there has been proposed a method wherein molybdenum is added to the Raney nickel as described in Japanese patent application publication No. 23,792/73, a method wherein molybenum and titanium or zirconium are added to the Raney nickel as described in Japanese patent application publication No. 22,996/75, and a method wherein iron and titanium or zirconium are added to the Raney nickel as described in Japanese patent application publication No. 22,997,75, which methods aim to activate and stabilize the catalyst. As a result, it was found out that the addition of titanium is particularly effective such that the polarization of conventional hydrogen electrodes using the Raney nickel can be reduced to about half as much. Nevertheless, in order to improve the electric current generation efficiency of fuel cells, a much better hydrogen electrode has been greatly desired.

SUMMARY OF THE INVENTION

Therefore, it is an object of the present invention to provide a hydrogen electrode which has far better characteristic properties than those of prior hydrogen electrodes wherein titanium is added.

The present invention is a hydrogen electrode for fuel cells which contains Raney nickel as a catalyst and about 0.2-2% by weight of chromium, relative to the Raney nickel in the Raney nickel.

Preferably, the amount or content of chromium in the Raney nickel is about 0.2-1.0% by weight.

Another aspect of the present invention relates to a method of producing a hydrogen electrode for fuel cells.

The method of producing the hydrogen electrode for fuel cells which uses Raney nickel containing about 0.2-2% by weight of chromium as a catalyst according to the present invention, comprises mixing a suspension of polytetrafluoroethylene (to be referred to as "PTFE" hereinafter) in a liquid suspension medium and a powder of the catalyst, while gradually dehydrating or drying the mixture at a low temperature.

The addition of chromium decreases the polarization of a hydrogen electrode containing Raney nickel as a catalyst and stabilizes the hydrogen electrode, so that the electric current generation efficiency of a fuel cell using the hydrogen electrode is improved and the output voltage of the fuel cell is stabilized.

The Raney nickel with added chromium has another advantageous feature in that it has a very wide suitable concentration range of chromium of about 0.2-2% by weight which gives the low polarization resistance.

Prior catalyst Raney nickel with added titanium has a narrow concentration range of titanium which gives the low polarization resistance of the hydrogen electrode and hence the polarization property of the hydrogen cell is very sensitive to preparation conditions of the hydrogen cell, so that exact reproduction of the hydrogen cell has been difficult.

In contrast, the Raney nickel with added chromium affords a substantially constant low polarization property of the hydrogen electrode over a wide concentration range of chromium. Therefore, even when the preparation conditions of the hydrogen cell vary considerably, a feature is obtained in that hydrogen cells of uniform characteristic property can be obtained without incurring a large fluctuation of the electrode property. This feature gives an advantage of making the quality control of the hydrogen electrodes easy when they are mass produced at a plant on an industrial scale.

Reaction at the hydrogen electrode is considered to proceed through the following two reaction steps.

$$H_2 \rightarrow 2Ha \tag{1}$$

$$2Ha + 2OH^- \rightarrow 2H_2O + 2e^- \tag{2}$$

wherein Ha is hydrogen in the atomic state which is dissociated and adsorbed on the surface of Raney nickel.

Because the polarization property of the hydrogen electrode depends mainly on the velocity of the reaction step (2), the decrease of the polarization resistance due to the addition of chromium can be considered as the result of accelerating the reaction step (2).

While the polarization property is an index for evaluating the characteristic property of a hydrogen electrode, the other index for evaluating the characteristic property of a hydrogen electrode is a limit electric current density, namely, the maximum electric current density which the hydrogen electrode can endure. Preferably, the limit electric current density is as high as possible and has a small temperature dependency.

BRIEF DESCRIPTION OF THE DRAWINGS

For a better understanding of the present invention, reference is made to the accompanying drawings in which.

DESCRIPTION OF THE PREFERRED EMBODIMENT

Hereinafter, the present invention will be explained in more detail with reference to an example and the attached drawings.

EXAMPLE 1

Preparation of the catalyst 60 parts by weight of aluminum and 40 parts by weight of a sum of nickel and chromium were weighed and charged in a high frequency induction furnace and melted therein. The melt was quenched and solidified by putting it in an iron cylinder. The resultant ingot was ground to a powder of $-37$ $\mu$m (400 mesh). The powder was treated in an aqueous solution of 6M-potassium hydroxide at 80° C. for 16 hrs to remove aluminum component therefrom so as to yield a powdery Raney nickel catalyst containing chromium in the solution. Thus obtained powdery Raney nickel catalyst containing chromium was taken out and washed by water and methanol alternately.

Production of Electrode

The above powdery Raney nickel catalyst containing chromium was mixed and kneaded with a suspension liquid of PTFE in a suspension medium such as water, oil or other suitable medium, while dehydrating or drying at a low temperature, preferably by blowing air thereover at room temperature. Thus formed gummy mixture was rolled to a sheet-like material. By these operations, the Raney nickel was stablized to lose its spontaneous ignition property. The sheet-like catalyst layer was bonded under pressure with a gas-side layer which consists of a waterproofed sheet of a black nickel powder to form a double layered green electrode. The green electrode was heated in a hydrogen gas stream at 180° C. for a few hours to activate the catalyst.

Measurement of Polarization

A hydrogen electrode is evaluated by a polarization value from which an Ohm loss is subtracted, as a characteristic value. The polarization value varies depending on temperature. Hence, in order to subtract Ohm loss, the polarization of the hydrogen electrode in terms of potential mV was measured at 60°±1° C. by the interrupter method. In the measurement, 6M-potassium hydroxide aqueous solution was used as an electrolyte solution, and circulated between the electrodes at a flow rate of 5 ml/min.

Study of the Results

Figure 1:
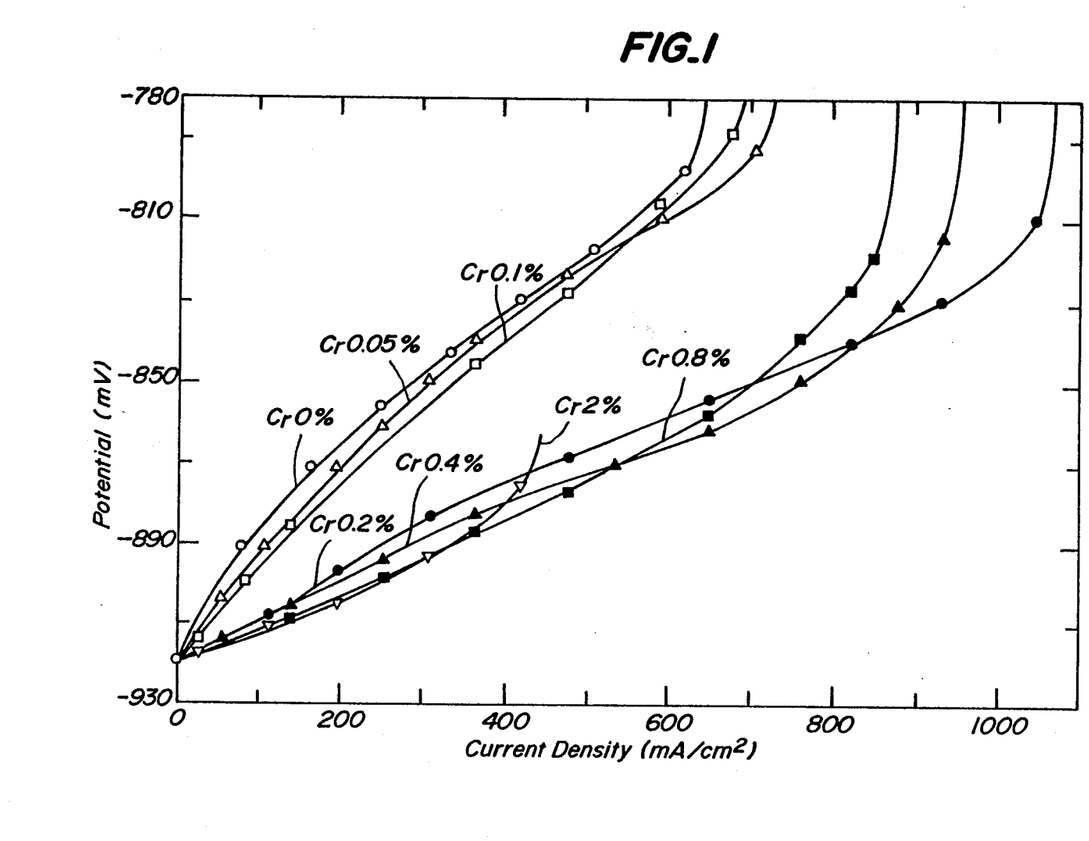
FIG. 1 is a characteristic graph showing the influence of Cr content in the Raney nickel on the polarization curve of the hydrogen electrode during operation.

The polarization curves of hydrogen electrodes using as a catalyst Raney nickel with added chromium (the amount of the catalyst is 40 mg/cm$^2$) is shown in FIG. 1. In FIG. 1, the curve with the symbol o indicates the hydrogen electrode wherein the catalyst has a chromium content of 0% (chromium is not added to the Raney nickel), the curve with the symbol Δ indicates the hydrogen electrode wherein the catalyst has a chromium content of 0.05% by weight, the curve with the symbol □ indicates the hydrogen electrode wherein the catalyst has a chromium content of 0.1% by weight, the curve with the symbol ● indicates the hydrogen electrode wherein the catalyst has a chromium content of 0.2% by weight, the curve with the symbol ▲ indicates the hydrogen electrode wherein the catalyst has a chromium content of 0.4% by weight, the curve with the symbol ■ indicates the hydrogen electrode wherein the catalyst has a chromium content of 0.8% by weight, and the curve with the symbol ▽ indicates the hydrogen electrode wherein the catalyst has a chromium content of 2% by weight. Each polarization value is a value from which Ohm loss has already been subtracted. At a chromium content of 0.1% or less, an appreciable effect due to the addition of chromium is not recognized. However, at a chromium content of 0.2% or more, a noticeable effect due to the addition of chromium appears and an extensive improvement of the polarization property is recognized. As clearly apparent from FIG. 1, the polarization curves are substantially linear at a low current density area. Therefore, from gradients of the linear curves the polarization resistances of the hydrogen electrodes can be calculated and the calculated values can be used as characteristic values of the catalysts activities. In FIGS. 1, 3, 5 and 6, the potentials are values taken using Hg/HgO as a referential electrode.

Figure 2:
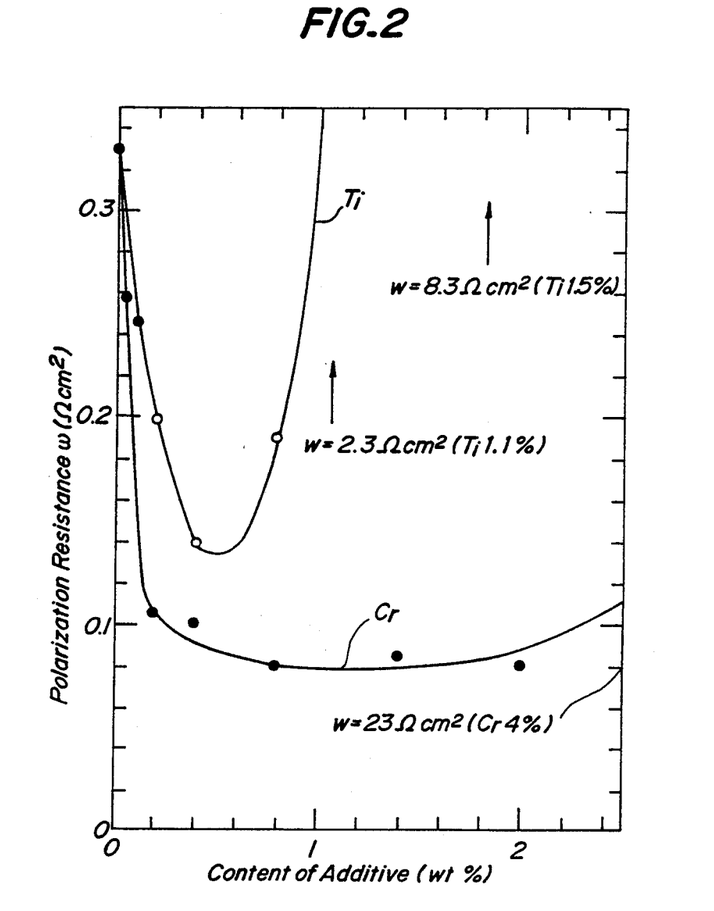
FIG. 2 is a characteristic graph showing the effect of addition of the additive Ti or Cr in the Raney nickel on the polarization resistance of the hydrogen electrode during operation.

FIG. 2 shows the relation between the chromium content and the polarization resistance $\omega$ of the hydrogen electrode thus obtained in which the amount of the catalyst is 40 mg/cm$^2$. The electrolyte solution used was 6M-KOH aqueous solution, and the temperature at the time of the measurement was 60° C. In FIG. 2, the results of a referential hydrogen electrode wherein Raney nickel catalyst containing titanium is used is also shown for comparison. Studying the results of the referential electrode, the minimum polarization resistance is obtained at a titanium content of about 0.5% by weight. According to a prior method of producing a hydrogen electrode wherein Raney nickel catalyst containing titanium is used, the product hydrogen electrode has the minimum polarization resistance at a titanium content of about 2%. In such prior method, a hydrogen electrode is produced by drying Raney nickel in vacuum, introducing air gradually into the vacuum so as to partially oxidize and stabilize the surface of the catalyst, and combining the catalyst after stabilization thereof with the other element of the hydrogen electrode. On the other hand, the method of the present invention does not intentionally oxide the surface of the catalyst. Instead, the present method mixes and kneads wet Raney nickel and a suspension liquid of PTFE while dehydrating the mixture at a low temperature, whereby the surface of the catalyst is stabilized and the spontaneous ignition of the catalyst is prevented. By this novel method of producing the hydrogen electrode according to the present invention, the optimum value of the content of the additive titanium is largely shifted to the low concentration side, so that the optimum value of titanium content of about 2% in the prior method became about 0.5% in the present method, as shown in FIG. 2.

In case of adding or incorporating chromium into the Raney nickel in the present method, the preferable content range of the additive chromium is about 0.2-2% by weight as shown in the same FIG. 2. If the hydrogen electrode containing chromium was produced by the prior method, the optimum content of chromium in the Raney nickel catalyst containing chromium of the hydrogen electrode would be at least 2% by weight or more. Therefore, the hydrogen electrode which uses Raney nickel as a catalyst having about 0.2–2% by weight of chromium added can only be produced by the present method.

The preferable range of chromium content in the Raney nickel catalyst containing chromium of the hydrogen electrode is about 0.2–1.0% by weight, if the hydrogen electrode is to be used for a long period of time such as more than 40,000 hrs or at least 5 years. This is because chromium has a considerably high solubility in alkaline aqueous solution as compared with that of titanium, and dissolution of chromium contained in the catalyst into the electrolyte solution reaches to an amount which is not negligible during a long period of time, and the catalyst surface is deformed and the electrolyte solution assumes a black color in a short period of time, if the chromium content in the catalyst of the hydrogen electrode is high exceeding about 1% by weight. According to the present invention, the optimum content of chromium can be depressed to not over about 1.0% by weight, so that the dissolution of chromium from the hydrogen electrode into the electrolyte solution can be decreased to a substantially negligible low level. Therefore, the hydrogen electrode of the present invention is extremely useful practically, and such hydrogen electrode using the Raney nickel containing not over about 1.0% by weight of chromium can only be produced by the present method.

When comparing the hydrogen electrode comprising the Raney nickel containing titanium with the hydrogen electrode comprising the Raney nickel containing chromium by values of polarization resistance thereof, the poralization resistance value of the former is decreased to about half as much as that of the hydrogen electrode comprising the Raney nickel not containing titanium or chromium, whereas the polarization resistance value of the latter can be decreased indeed to about a quarter or ¼ of the hydrogen electrode comprising the Raney nickel not containing titanium or chromium, as shown in FIG. 2. From this comparison, it is clear that the Raney nickel containing chromium according to the present invention is about twice as good as the prior best Raney nickel containing titanium, as a catalyst for the hydrogen electrode. It is also clear that the present invention can never be invented easily from Japanese patent application publication Nos. 22,996/75 and 22,997/75 which describe that the addition of chromium is not preferable.

As seen from FIG. 2, the Raney nickel containing chromium has another advantageous feature in that the preferable range of the chromium content, wherein the polarization resistance of the hydrogen electrode using the same is low, is exceedingly wide.

Regarding the limit electric current density which is the other characteristic index for evaluating the characteristic property of a hydrogen electrode, FIG. 1 clearly shows that the limit electric current density is maximum at a chromium content of 0.2% from which it is decreased with the increase of the chromium content. However, the polarization resistance of the hydrogen electrode continues to decrease at a chromium content of more than 0.2%, as shown in FIG. 2. Thus, there is no parallel relation between the polarization resistance and the limit electric current density. Such absence of a parallel relation is due to a fact that the limit electric current density depends mainly on the velocity of the reaction of the aforedescribed reaction formula (1).

Figure 3:
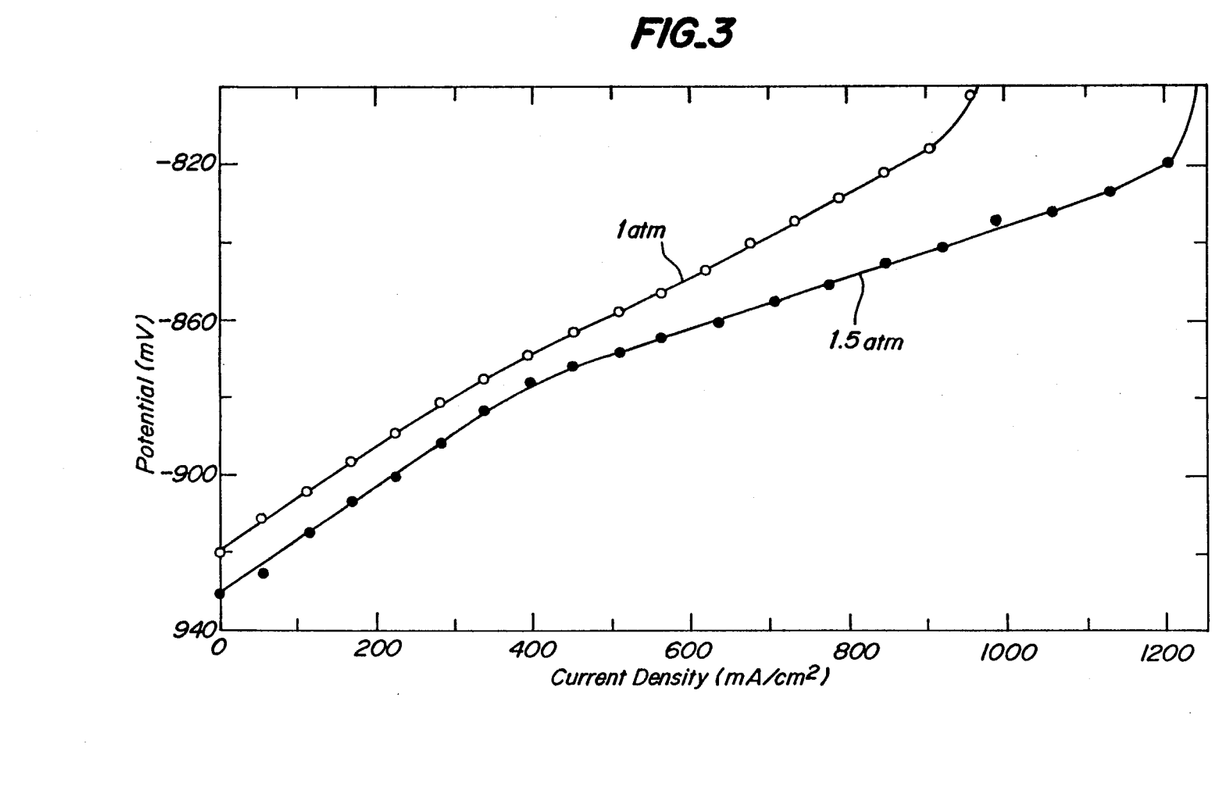
FIG. 3 is a characteristic graph showing the influence of hydrogen gas pressure around the hydrogen electrode on the electric properties of the hydrogen electrode.

With the increase of hydrogen gas pressure, the reaction speed of the reaction (1) is increased and the speed of supplying Ha is increased, so that the limit electric current is increased. An illustrative example thereof is shown in FIG. 3. In the case of the experiment of FIG. 3, the amount of the catalyst is 30 mg/cm$^2$ in the hydrogen electrode and the chromium content is 0.2% by weight in the catalyst, and the measured values are those from which Ohm losses have been subtracted. When the hydrogen gas pressure is elevated to 1.5 atm, a limit electric current of 1.2 A/cm$^2$ is obtained.

Figure 4:
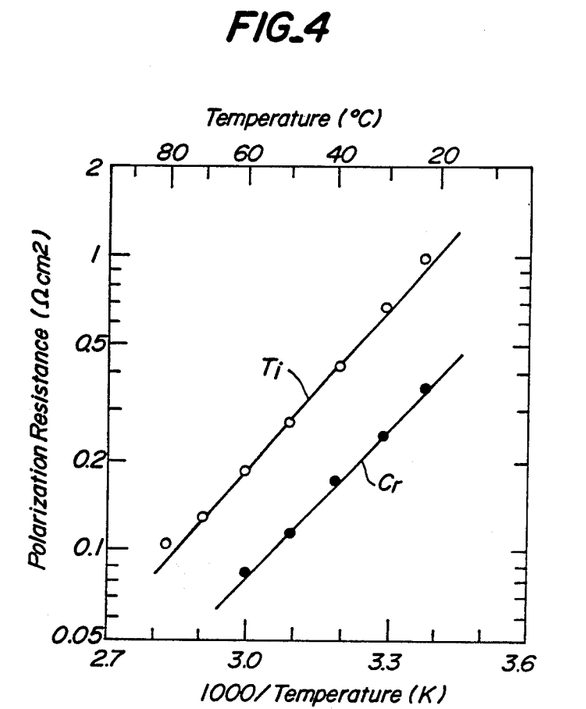
FIG. 4 is a characteristic graph showing the temperature dependency of the polarization resistance of the hydrogen electrode containing Raney nickel added with Cr or Ti during operation.

The temperature dependency curves of the polarization resistance are shown in FIG. 4. From the gradients of the curves the activation energy of the polarization is calculated as 31.6 KJ/mol for the hydrogen electrode comprising the Raney nickel catalsyt containing 0.2% by weight of chromium, and 34.5 KJ/mol for the hydrogen electrode comprising Raney nickel catalyst containing 0.2% of titanium. Therefore, the effect of the addition of chromium can be explained as the lowering of the activation energy of the reaction of the above reaction formula (2). In the case of FIG. 4, the content of the additive Ti or Cr in the catalyst in 0.8% by weight, and the amount of the catalyst is 40 mg/cm$^2$ in the hydrogen electrode.

The temperature dependency of the limit electric current is small such that the hydrogen electrode having a limit electric current of 900 mA/cm$^2$ at 60° C. can still retain a high limit electric current of 500 mA/cm$^2$ at 30° C.

Figure 5:
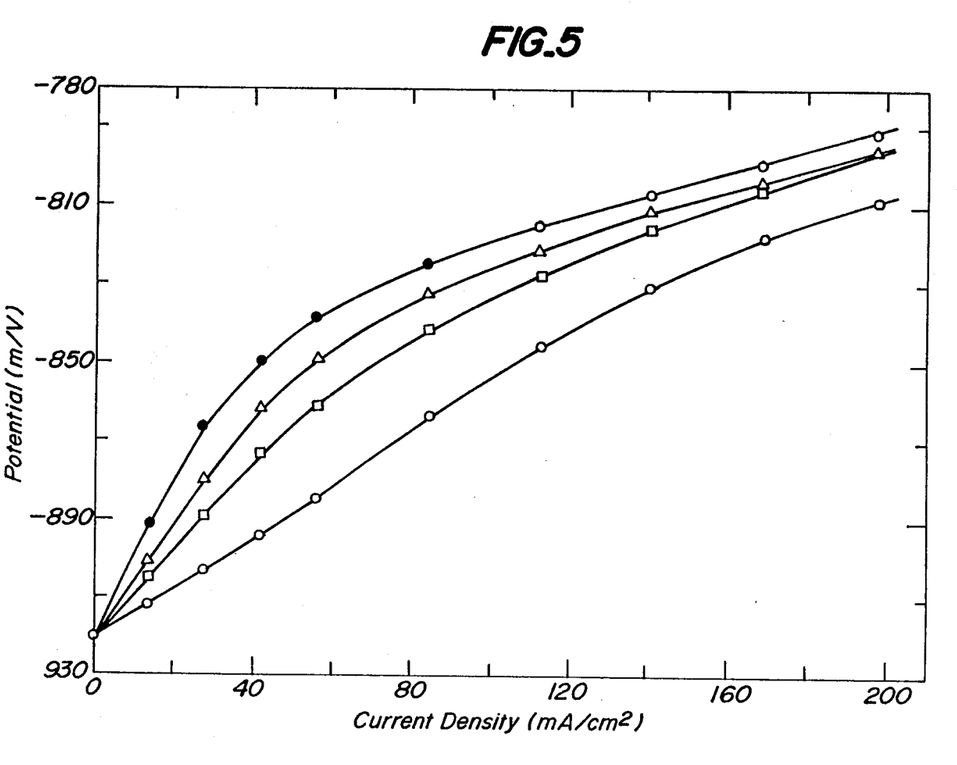
FIG. 5 is a characteristic graph showing changes in the polarization property of a hydrogen electrode containing a Raney nickel catalyst without added Cr under repetitive loading and unloading thereof.

The hydrogen electrode comprising 21 mg/cm$^2$ of the Raney nickel not containing the additive shows, when subjected to repetition of a load-unload cycle, a deterioration of the polarization property as shown in FIG. 5. This is presumably because the surface state of the Raney nickel is unstable and the activity of the catalyst is decreased by the repetition of the cycle. Such deterioration of the catalyst activity can be prevented by the addition of chromium.

Figure 6:
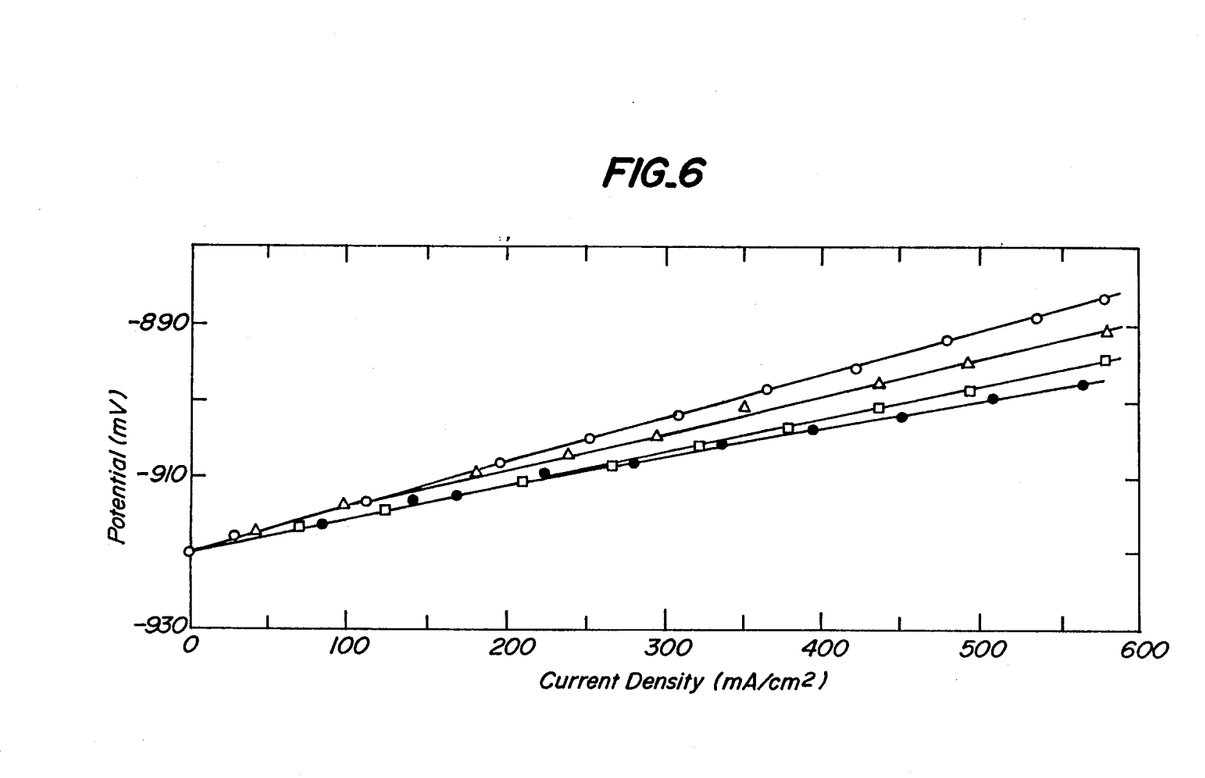
FIG. 6 is a characteristic graph showing changes in the polarization property of the hydrogen electrode of the present invention due to repetitive loading and unloading thereof.

The change of the characteristic value of the polarization of the hydrogen electrode comprising 52 mg/cm$^2$ of the Raney nickel catalyst containing 0.8% by weight of chromium due to the repetition test of load-unload is shown in FIG. 6. The large increase of the polarization resistance of the hydrogen electrode comprising the Raney nickel catalyst not containing the additive shown in FIG. 5 can not be seen in FIG. 6. In both FIGS. 5 and 6, the symbols O, □, △ and ● represent the values of those tests wherein the load-unload cycle is repeated 1,2, 3 and 4 times, respectively. All the values in FIGS. 5 and 6 are those from which Ohm losses have been subtracted.

FIG. 6 is also an example of the maximum polarization characteristic property achieved by the present invention. Polarization resistance calculated from the gradient of the linear polarization curve is a quite low value of 0.04 Ωcm$^2$ which is event less than one-half of the maximum characteristic value of 0.1 Ωcm$^2$ of the hydrogen electrode using the Raney nickel catalyst containing titanium attained by Siemens A. G. of West Germany. The hydrogen electrode in FIG. 6 comprises 52 mg/cm$^2$ of the catalyst containing 0.8% of chromium.

As explained in detail in the foregoings, the present invention contributes materially to the improvement and stabilization of the characteristic properties of the hydrogen electrode comprising the Raney nickel. Thus, according to the present invention, an excellent hydrdogen electrode of a far smaller polarization than the prior hydrogen electrodes comprising the Raney nickel can be mass produced industrially. Thus, the present invention is eminently useful industrially.

Though the present invention has been described with specific example and numerical values, it is of course apparent to those skilled in the art that various changes and modifications thereof are possible without departing the broad spirit and aspect of the present invention as hereinafter claimed.

What is claimed is:

1. A method of producing a hydrogen electrode comprising a Raney nickel catalyst containing from about 0.2 to 2% by weight of chromium for use in an alkaline hydrogen-oxygen fuel cell, the method comprising mixing and kneading a powder of the Raney nickel catalyst, which Raney nickel catalyst would be subject to ignition if dry, and a suspension of polytetrafluoroethylene in a suspension medium to form a mixture, while drying the mixture at the same time at a temperature effective to remove the suspension medium, whereby the surface of the Raney nickel catalyst is stabilized and spontaneous ignition of the Raney nickel catalyst is prevented.

2. The method as defined in claim 1, wherein the powder of the catalyst and a suspension of PTFE in water are mixed and kneaded to form a mixture, and drying is accomplished by blowing air over the mixture at room temperature.

3. A method of producing a hydrogen electrode comprising a Raney nickel catalyst containing from about 0.2 to 2% by weight of chromium for use in an alkaline hydrogen-oxygen fuel cell, the method comprising:
mixing and kneading a powder of the Raney nickel catalyst, which Raney nickel catalyst would be subject to ignition if dry, and a suspension of polytetrafluoroethylene (PTFE) in a suspension medium to form a mixture, while drying the mixture at the same time at a temperature effective to remove the suspension medium and to form a gummy mixture whereby the surface of the Raney nickel catalyst is stabilized and spontaneous ignition of the Raney nickel catalyst is prevented;
rolling the gummy mixture into a sheet; and
bonding the sheet under pressure to a gas-side layer to form a double-layered hydrogen electrode.

4. The method as defined in claim 1, wherein the powder of the Raney nickel catalyst is a wet powder and the process comprises the further steps of:
melting 60 parts by weight of aluminum and 40 parts by weight of a nickel and chromium mixture containing from about 0.2 to 2% by weight of chromium to form a melt;
quenching and solidifying the melt by placing it in an iron cylinder to form an ingot;
grinding the ingot to a powder;
treating the powder with an aqueous solution of potassium hydroxide to remove the aluminum and provide a powdery Raney nickel catalyst; and
recovering the powdery Raney nickel catalyst and washing the catalyst alternatingly with water and alcohol to provide the wet powder.

5. The process of providing an alkaline-type hydrogen-oxygen fuel cell with a hydrogen electrode comprising introducing into the alkaline hydrogen-oxygen fuel cell a hydrogen electrode comprised of a Raney nickel catalyst containing from about 0.2 to 2% by weight of chromium and prepared by a method comprising mixing and kneading a powder of the Raney nickel catalyst, which Raney nickel catalyst would be subject to ignition if dry, and a suspension of polytetrafluorethylene (PTFE) in a suspension medium to form a mixture, while drying the mixture at the same time at a temperature effective to remove the suspension medium, whereby the surface of the Raney nickel catalyst is stabilized and spontaneous ignition of the Raney nickel catalyst is prevented.

6. The process as defined in claim 5, wherein the powder of the catalyst and a suspension of PTFE in water are mixed and kneaded to form a mixture, and drying is accomplished by blowing air over the mixture at room temperature.

7. The process as defined in claim 5, wherein the powder of the Raney nickel catalyst is a wet powder and the process comprises the further steps of:
melting 60 parts by weight of aluminum and 40 parts by weight of a nickel and chromium mixture containing from about 0.2 to 2% by weight of chromium to form a melt;
quenching and solidifying the melt by placing it in an iron cylinder to form an ingot;
grinding the ingot to a powder
treating the powder with an aqueous solution of potassium hydroxide to remove the aluminum and provide a powdery Raney nickel catalyst; and
recovering the powdery Raney nickel catalyst and washing the catalyst alternatingly with water and alcohol to provide the wet powder.

8. The process of providing an alkaline hydrogen-oxygen fuel cell with a hydrogen electrode comprising introducing into the alkaline hydrogen-oxygen fuel cell a hydrogen electrode comprised of a Raney nickel catalyst containing about 0.2 to 2% by weight of chromium and prepared by a method comprising:
mixing and kneading a powder of the Raney nickel catalyst, which Raney nickel catalyst would be subject to ignition if dry, and a suspension of polytetrafluoroethylene (PTFE) in a suspension medium to form a mixture, while drying the mixture at the same time at a temperature effective to remove the suspension medium and to form a gummy mixture, whereby the surface of the Raney nickel catalyst is stabilized and spontaneous ignition of the Raney nickel catalyst is prevented;
rolling the gummy mixture into a sheet; and
bonding the sheet under pressure to a gas-side layer to form a double-layered hydrogen electrode.

9. The process as defined in claim 8, wherein the powder of the catalyst and a suspension of PTFE in water are mixed and kneaded to form a mixture, and drying is accomplished by blowing air over the mixture at room temperature.

10. The process as defined in claim 8, wherein the powder of the Raney nickel catalyst is a wet powder and the process comprises the further steps of:
melting 60 parts by weight of aluminum and 40 parts by weight of a nickel and chromium mixture containing from about 0.2 to 2% by weight of chromium to form a melt;
quenching and solidifying the melt by placing it in an iron cylinder to form an ingot;
grinding the ingot to a powder;
treating the powder with an aqueous solution of potassium hydroxide to remove the aluminum and provide a powdery Raney nickel catalyst; and recovering the powdery Raney nickel catalyst and washing the catalyst alternatingly with water and alcohol to provide the wet powder.

11. The method as defined in claim 3, wherein the powder of the catalyst and a suspension of PTFE in water are mixed and kneaded to form a mixture and drying is accomplished by blowing air over the mixture at room temperature.

12. The method as defined in claim 3, wherein the powder of the Raney nickel catalyst is a wet powder and the process comprises the further steps of:

melting 60 parts by weight of aluminum and 40 parts by weight of a nickel and chromium mixture containing from about 0.2 to 2% by weight of chromium to form a melt;

quenching and solidifying the melt by placing it in an iron cylinder to form an ingot;

grinding the ingot to a powder treating the powder with an aqueous solution of potassium hydroxide to remove the aluminum and provide a powdery Raney nickel catalyst; and recovering the powdery Raney nickel catalyst and washing the catalyst alternatingly with water and alcohol to provide the wet powder.

* * * * *

UNITED STATES PATENT AND TRADEMARK OFFICE
CERTIFICATE OF CORRECTION

PATENT NO. : 4,800,139
DATED : January 24th, 1989
INVENTOR(S) : Tadao KENJYO

It is certified that error appears in the above-identified patent and that said Letters Patent is hereby corrected as shown below:

On the title page Insert
--[30]  Foreign Application Priority Data
   Dec. 27, 1984  [JP] Japan 281,352/84 --.

Signed and Sealed this

First Day of August, 1989

Attest:

DONALD J. QUIGG

Attesting Officer

Commissioner of Patents and Trademarks